Jan. 5, 1971 A. G. WELLBROCK 3,552,825
VARIABLE DIGITAL LIGHT DEFLECTOR

Filed March 28, 1969 2 Sheets-Sheet 1

INVENTOR
ANTON G. WELLBROCK
BY Homer L. Knearl
AGENT

Jan. 5, 1971 A. G. WELLBROCK 3,552,825

VARIABLE DIGITAL LIGHT DEFLECTOR

Filed March 28, 1969 2 Sheets-Sheet 2

3,552,825
VARIABLE DIGITAL LIGHT DEFLECTOR
Anton G. Wellbrock, Boulder, Colo., assignor to International Business Machines Corporation, Armonk, N.Y., a corporation of New York
Filed Mar. 28, 1969, Ser. No. 811,289
Int. Cl. G02f 3/00
U.S. Cl. 350—160                                                                7 Claims

ABSTRACT OF THE DISCLOSURE

Variable digital light deflection is obtained by stacking light deflection plates on the hypotenuse of a right-angle prism. Light enters one face of the prism and strikes the hypotenuse of the prism at an angle equal to or greater than the critical angle. Normally, the light will be totally internally reflected in the prism and pass out the other face of the prism. However, if a deflector plate is attached to the hypotenuse of the prism and is making optical contact with the hypotenuse of the prism, the total internal reflection will be frustrated, and the light beam will pass into the deflector plate. The deflector plates may be stacked one on top of the other. The phenomenon of total internal reflection and frustration of total internal reflection is used to control how many deflector plates the light beam passes through before it is totally internally reflected and moves back through the deflector plates, the prism, and out the face of the prism. The deflector plates may be solid glass plates or liquid cells. They may be energized by a piezoelectric crystal to flex and thereby make or break optical contact.

CROSS-REFERENCES TO RELATED APPLICATIONS

Commonly assigned, U.S. Pat. 3,514,183 filed Nov. 6, 1967, entitled "Light Deflector System," invented by Melbourne Rabedeau, teaches a solid glass plate attached to a prism for use as a light deflector.

Co-pending, commonly assigned patent application, Ser. No. 776,056, filed Nov. 15, 1968, entitled "Light Deflector System," invented by Geoffrey Bate and Anton Wellbrock, teaches a light deflector plate attached to a prism wherein the plate is a liquid cell with a transparent glass diaphragm to make or break the optical contact with the prism.

BACKGROUND OF THE INVENTION

This invention relates to stacking light deflectors on a prism to obtain variable digital light deflection by use of the principle of frustrated total internal reflection.

The phenomenon of frustrated total internal reflection can be observed by bringing two pieces of optical material having the same index of refraction into optical contact. If the materials are separated slightly with a material of lower index refraction, such as air or a vacuum, and if light is shined through one of the materials and strikes the boundary of that material at the critical angle, the light will be totally internally reflected. On the other hand, if the second optical material is brought closer and closer to the boundary of the first optical material, the total internal reflection will be frustrated. When the two pieces of material are within approximately one-eighth of a wavelength, the light beam is no longer internally reflected, but instead, is passed into the second optical material. This phenomenon is described in detail in the above-cited, co-pending, commonly assigned patent applications.

In the Rabedeau patent application, the light deflector plate is a solid plate which, when brought under pressure by a piezoelectric crystal, is flexed out of optical contact with an adjacent optical prism. This causes the total internal reflection to occur at the boundary of the prism, rather than at the outer boundary of the deflector plate.

In the Bate et al. patent application, the deflector is a liquid cell with a thin flexure plate whereby a much thicker deflector is achieved. In the Bate et al. deflector, when a piezoelectric material is energized, the thin flexure plate is flexed to make or break contact with the adjacent prism. With the plate and the prism in contact, total internal reflection will occur in the liquid cell, rather than in the prism.

Both the Rabedeau patent application and the Bate et al. patent application show binary digital, variable light deflectors.

It is an object of this invention to improve the variable digital light deflectors by stacking deflectors.

SUMMARY OF THE INVENTION

In accordance with the invention, the above object is accomplished by stacking deflectors on a prism or other light transparent member having an index of refraction substantially the same as the deflectors. The amount of deflection is controlled by energizing deflectors in the stack so as to make or break optical contact between adjacent deflectors. Total internal reflection occurs in the deflector nearest the prism whose outer boundary is not in optical contact with the deflector stacked thereon.

In one feature of the invention, the amount of light deflection is controlled by flexing solid deflector plates in the stack.

It is another feature of the invention to control deflection by flexing liquid cell deflectors in the stack.

One advantage of the invention is that it is much smaller and more compact than the prior digital light deflectors. The prior deflectors were binary in nature. Because they were not stacked, they had to be placed along an optical path. This inherently means a relatively long optical path to obtain the total amount of variable light deflection desired. In the subject invention, a single small prism with light deflector plates stacked thereon is all that is required.

Another advantage of the invention is that it operates at a very high speed since all that is required is energization of a piezoelectric crystal.

The foregoing and other objects, features and advantages of the invention will be apparent from the following more particular description of preferred embodiments of the invention, as illustrated in the accompanying drawings.

DETAILED DESCRIPTION

Figure 1:
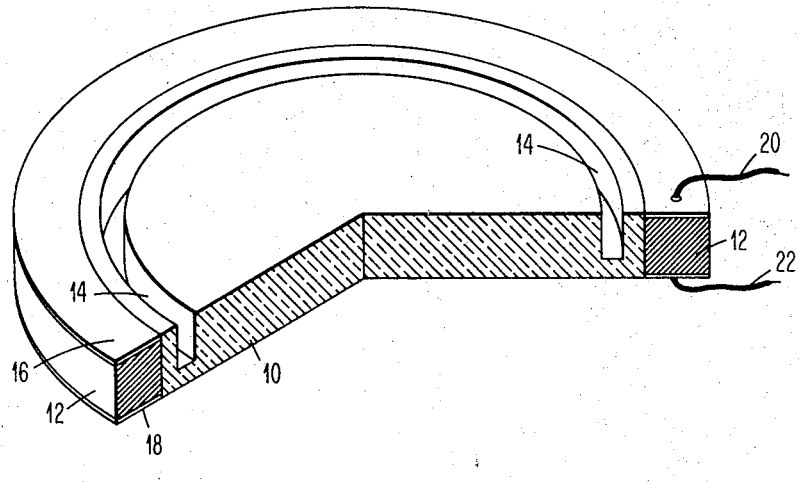
FIG. 1 shows a solid light deflector plate with an annular piezoelectric crystal.

Referring now to FIG. 1, a solid deflector plate consists of a glass plate 10 surrounded by a piezoelectric crystal 12. An annular groove 14 is cut in the glass plate 10 a short distance from the crystal 12.

The axis of expansion for the crystal 12 is horizontal and the electrical field energization of the crystal is vertical. Accordingly, the top of the crystal is coated with a conductive layer 16, and the bottom of the crystal is likewise coated with a conductive layer 18. Electrical wire 20 provides contact to the electrical plate 16 while electrical wire 22 provides contact to the electrical plate 18.

To activate the crystal, a voltage is applied at the end of the wires 20 and 22 and thus across the crystal via conductive electrical plates 16 and 18. The crystal 12, when energized by an electric field, expands horizontally and compresses the glass plate 10. As the plate 10 is compressed, the center of the plate will buckle upward. The plate flexes about the annular groove 14.

Figure 2:
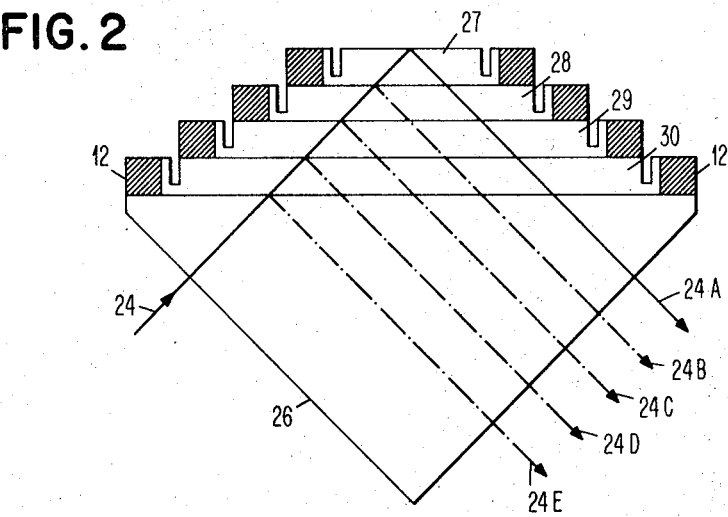
FIG. 2 shows an embodiment of the invention utilizing a prism and a stack of solid light deflector plates similar to the plate shown in FIG. 1.
Figure 3:
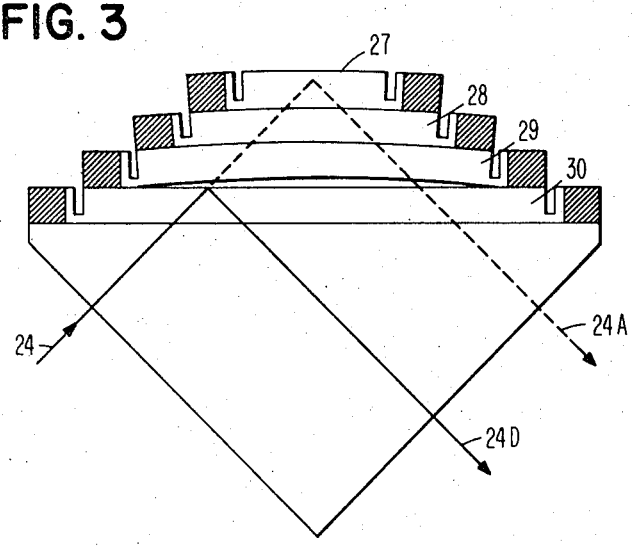
FIG. 3 shows the same stack of light deflector plates as FIG. 2, except that the uppermost three plates have been energized, and a change in light deflection has occurred.

FIGS. 2 and 3 show one preferred embodiment of the invention using the solid deflector plate depicted in detail in FIG. 1. In FIG. 2, a schematic cross-section of the embodiment of a prism with stacked solid deflector plates is shown with the plates in a relaxed or unflexed state. In FIG. 3 the same cross-sectional view of the solid deflector plates attached to a prism is shown, but the piezoelectric crystals on the top three plates have been energized, and these plates are flexed.

In FIG. 2, the light beam 24 enters the right-angle prism 26 and passes through all of the stacked plates 27. The beam 24 strikes the top boundary of the top plate 27 and is totally internally reflected back through the other plates and prism 26. Total internal reflection occurs because the beam 24 strikes the top boundary of plate 27 at an angle exceeding the critical angle. As is well known, the critical angle is that where the sine of the angle of incidence is greater than the index of refraction of the second media divided by the index of refraction of the first media. In FIG. 2, it can be assumed that the plates in the prism are made of glass, and the outer, or surrounding area, is air or a vacuum. Of course, other materials could be used having different indices of refraction. It is only required that the outer surrounding area have a lower index of refraction than the prism and deflection plates. If this last condition is not satisfied, then, of course, there would be no total internal reflection at any angle.

Beam 24 passes through all of the deflection plates because the plates adjacent to each other are in optical contact. The plates have polished surfaces, and the separation between them is so slight—in the order of one-quarter or one-eighth of a wavelength—that no reflection occurs at each boundary between the plates. The plates have substantially the same index of refraction as the prism, and therefore total internal reflection is frustrated.

To obtain a change in the path of the beam 24, selected deflectors in the stack of deflectors are energized causing them to break optical contact with the lower plates. For example, in FIG. 3, beam 24 is deflected into beam path 24D. Total internal reflection occurs at the top of plate 30 because plates 27, 28, and 29 have been energized and are flexed upward. This leaves a space between plates 30 and 29, and thus, total internal reflection occurs at the top of plate 30. Of course, only plate 29 need be energized as that will break the optical contact at the top of plate 30. However, it is preferred to energize all of the top plates so that they will move in unison and thus, the lower plate does not have to lift a higher plate.

The amount of change in deflection is shown in FIG. 3 by superimposing, in dash lines, the beam 24A as if had passed through to the topmost deflector plate as in FIG. 2. Other amounts of deflection can be obtained by selectively energizing other deflection plates in the stack. In the stack of plates as shown in FIG. 2, there are five different deflections, 24A, 24B, 24C, 24D, and 24E available—one for each boundary. Of course, more deflection plates could be added to the stack to obtain more deflections.

For sake of showing the operation of the invention, the apparatus in FIGS. 2 and 3 have been exaggerated in size, and, in particular, the flexing of plates in FIG. 3 has been exaggerated in size. In actuality, the flexure is in the order of a few thousand angstrom units. The amount of flexure required is dependent upon the wavelength of the light which is being deflected. To be assured of total internal reflection at the boundary, the flexure must be such as to cause a separation of approximately two wavelengths between a plate and the prism or between two stacked plates. Conversely, to insure complete frustration of total internal reflection, the plates should be within a quarter or one-eighth of a wavelength of each other when they are in optical contact.

Figure 4:
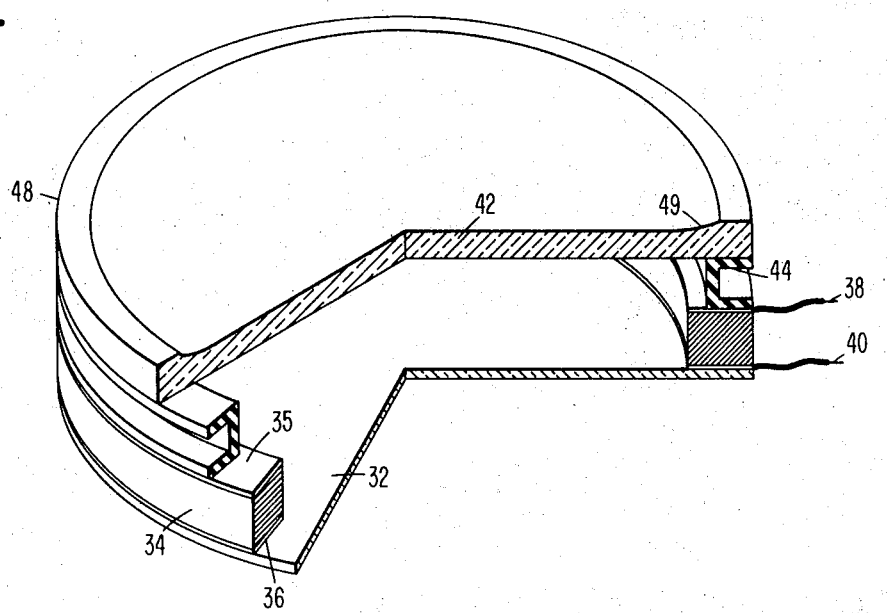
FIG. 4 shows a liquid cell light deflector.
Figure 5:
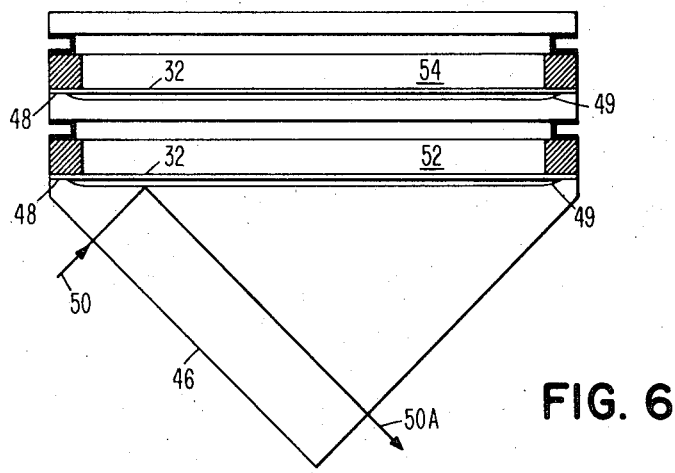
FIG. 5 shows an embodiment of the invention utilizing a prism, and a stack of liquid cell light deflectors similar to the deflector shown in FIG. 4.
Figure 6:
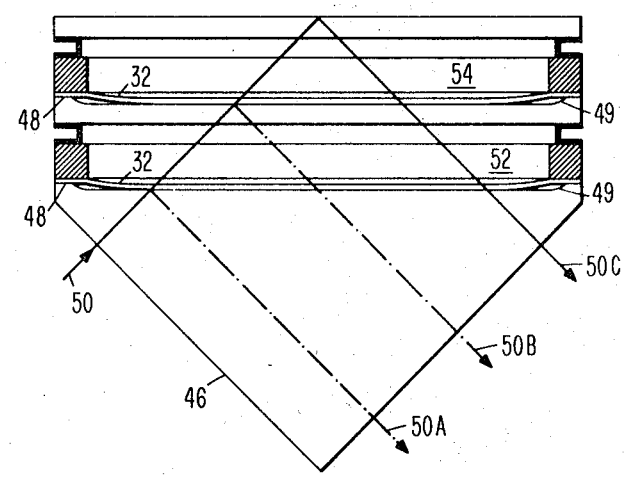
FIG. 6 shows the same stack of deflector as in FIG. 5, except that the deflectors have been energized, and a change in light deflection has occurred.

An alternative embodiment of the invention is shown in FIGS. 5 and 6 with a liquid cell deflector attached to a prism. The liquid cell deflector is shown in FIG. 4. The advantage of the liquid cell deflector is that when a large deflection in the order of more than a hundred mils is desired, the high-switching speed can be maintained by use of a liquid cell deflector. Solid plates may be used to obtain large deflections, but because of the large thickness and mass involved, the speed of changing deflection is slowed. Therefore, when deflection increments of more than a hundred mils are desired, the preferred embodiment of the invention is as shown in FIGS. 5 and 6 with liquid cell deflectors attached to a prism.

In FIG. 4, the liquid-cell deflector is shown with a section cut therefrom. Glass plate 32 is the flexure plate in the liquid cell deflector. The piezoelectric crystal 34 is bonded to the plate 32. The top layer 35 and the bottom layer 36 attached to the crystal 34 are electrically conductive. Conductive wires 38 and 40 provide electrical contact to the layers 35 and 36, respectively. A voltage can then be applied between the conductive layers 35 and 36 causing the piezoelectric crystal to expand horizontally.

When the piezoelectric crystal expands, the glass plate 32 is compressed and flexed down. The glass plate 42, which forms the top of the cell, generally, does not flex. The top plate may be thin and flexible if desired; however, in this preferred alternative embodiment, the top plate does not flex. Between the two plates 32 and 42 is a liquid, such as immersion oil, which has substantially the same index refraction as glass. Elastic diaphragm 44 connects the bottom of the plate 42 to the top of the crystal 34. Therefore, when the bottom glass plate 32 flexes down, the oil moves with the glass plate, and the diaphragm 44 flexes to absorb the movement, so that there is no change in volume occupied by the oil. This operation permits a small glass plate 32 to be rapidly flexed. A solid glass plate of the same thickness as this liquid cell would have a relatively slower flexure speed.

A schematic cross-section of the alternative preferred embodiment of the invention, is shown in FIG. 5 with the deflector plates in a relaxed condition. Both the prism 46 and the deflectors in the stack have a built-up annular ring 48 on their topmost boundary. Ring 48 has an inner beveled edge 49 to insure that plate 32 will flex down when compressed. This annular ring supports the deflector cell which is stacked immediately above. In a relaxed condition, the glass plate 32 of each cell is separated from the prism or lower cell by the ring 48.

As shown in FIG. 5, the light beam 50 enters prism 46, strikes the top boundary of the prism, and is totally internally reflected out the other side of the prism along beam path 50A. To change the beam path, the piezoelectric crystals on deflector plate 52 may be energized or the piezoelectric crystals on deflector plate 54 may be energized along with those on plate 52.

In FIG. 6, both the piezoelectric crystals of plate 52 and 54 are energized. This causes the glass plates 32 in both of these deflectors to flex down to make optical contact with the glass immediately below. The light beam 50 then passes through the prism 46, through deflector 52, and deflector 54, until it is totally internally reflected at the top boundary of deflector 54. The light beam is then reflected back through the deflectors and the prism, and out the other side of the prism along beam path 50C. Alternatively, if only the piezoelectric crystal of deflector 52 had been energized, the beam 50 would have been totally internally reflected at the top of the deflector 52 and back through the prism along beam path 50B.

As is clear from FIG. 6, there can be three possible beam paths according to how many deflectors are energized. Of course, the number of paths available can be increased by stacking more liquid cell deflectors.

As pointed out previously, the advantage of using liquid cell deflectors is that the increments of deflection can be larger and without sacrificing speed of changing deflection.

Another feature of the liquid cell deflector embodiment is that in a relaxed state the total internal reflection occurs at the prism, rather than at the last deflector plate in the stack. In other words, in the liquid cell embodiment, the relaxed state corresponds to no optical contact between plates of the stack. This is in contrast to the solid plate embodiment where in the relaxed state all of the deflector plates are in contact.

It will be appreciated by one skilled in the art that many variations in hardware may be made without departing from the spirit of the invention. For example, magnetostrictive crystals might be used in place of the piezoelectric crystals. In addition, the liquid cell deflectors might be constructed so that in a relaxed state they make optical contact, and, when energized, they break optical contact. Conversely, the solid deflector plates might be made so that in a relaxed state they do not make optical contact, and in an energized state they make optical contact. Also, the materials used need not be glass. Furthermore, their outside shape is not material to the invention. It is only required that the light beams strike the boundary where the deflector plates are stacked at an angle of incidence equal to or greater than the critical angle.

While the invention has been particularly shown and described with reference to preferred embodiments thereof, it will be understood by those skilled in the art that various changes in form and details may be made therein without departing from the spirit and scope of the invention.

What is claimed is:

1. An improved, variable, digital light deflector for varying the path of a light beam comprising a light transparent member composed of material having a relatively high index of refraction, said member positioned to receive and transmit the light beam, said member including a "reflect" boundary surface normally in contact with space of relatively low index of refraction, said boundary surface oriented to intersect the light beam at an angle of incidence equal to or greater than the critical angle, wherein the improvement comprises:

a plurality of light deflecting members, each light deflecting member composed of light-transparent material having substantially the same index of refraction as said light-transparent member, said deflecting member including a "transmit" boundary surface and a "reflect" boundary surface, the plurality of deflecting members stacked one on top of another with the "transmit" boundary surface of one juxtaposed to the "reflect" boundary surface of another and stacked with the transmit boundary surface of the lowermost deflecting member juxtaposed to the "reflect" boundary surface of said light-transparent member;

a plurality of moving means, each moving means for moving a deflecting member into one of two positions whereby in one position the "transmit" boundary surface of one deflecting member is in optical contact with the adjacent "reflect" boundary surface, and total internal reflection at the "reflect" boundary surface would be frustrated, while in the other position a space having relatively low index of refraction lies between the two boundary surfaces, and total internal reflection can occur at the "reflect" boundary surface, each of said moving means on each of said deflecting means being selectively energized whereby the first boundary surface at which total internal reflection occurs in the stack of deflecting members may be varied and thereby vary the path of the light beam.

2. The apparatus of claim 1, wherein said transparent member is composed of glass; and said deflecting members are glass plates which, when compressed, flex and make or break optical contact between adjacent "transmit" and "reflect" boundary surfaces.

3. The apparatus of claim 2, wherein said moving means is a piezoelectric crystal for compressing the glass plate on which the crystal is acting and thereby causes the glass plate to flex.

4. The apparatus of claim 3, wherein the boundary surfaces in the variable digital light deflector are normally in optical contact and selectively break optical contact when the piezoelectric crystals are selectively energized.

5. The apparatus of claim 1, wherein said transparent member is composed of glass; and said deflecting members are liquid cell deflecting members made up of a top and bottom glass plate with immersion oil, having substantially the same index of refraction as glass, filling the volume between the plates, said bottom plate being thin and flexible so that, when compressed, the plate flexes to make or break optical contact between adjacent "transmit" and "reflect" boundary surfaces.

6. The apparatus of claim 5, wherein said moving means is a piezoelectric crystal bonded to said thin, flexible glass plate in the liquid cell whereby the thin, flexible glass plate is flexed when the crystal is energized.

7. The apparatus of claim 6, wherein boundary surfaces in the variable digital light deflector are normally not in optical contact and are selectively flexed into optical contact when the piezoelectric crystals are selectively energized.

References Cited

UNITED STATES PATENTS 2,565,514  8/1951  Pajes _____ 350—285

OTHER REFERENCES

"News in Focus" Laser Focus, vol. 5, No. 7, April 1969, pp. 16–19.

RONALD L. WIBERT, Primary Examiner

P. K. GODWIN, Assistant Examiner

U.S. Cl. X.R.

350—161, 285